United States Patent [19]

Chase

[11] 4,168,574
[45] Sep. 25, 1979

[54] ADJUSTABLE PARALLEL MACHINE TOOL

[76] Inventor: Herschel B. Chase, 500 U.S. Highway 1, Juno Beach, Fla. 33408

[21] Appl. No.: 891,042

[22] Filed: Mar. 28, 1978

[51] Int. Cl.² .......................... G01B 5/02; G01B 3/30
[52] U.S. Cl. ........................................ 33/162; 33/163
[58] Field of Search ............... 33/154 E, 159, 162, 33/163, 164 R, 168 B, 170, 174 H

[56] References Cited

U.S. PATENT DOCUMENTS

| 151,824 | 6/1874 | Barsantee | 33/154 E |
| 1,339,984 | 5/1920 | Runge | 33/164 R |
| 2,353,886 | 7/1944 | Findley et al. | 33/162 |
| 2,557,702 | 6/1951 | Soukup et al. | 33/162 |
| 2,841,876 | 7/1958 | Pittenger | 33/170 |
| 3,247,598 | 4/1966 | Wilkes | 33/162 |
| 3,638,323 | 2/1972 | Groe | 33/162 |

Primary Examiner—Richard R. Stearns
Attorney, Agent, or Firm—Sherman & Shalloway

[57] ABSTRACT

An upper wedge having a T-groove therein is slideably connected to a lower wedge having a tee thereon forming opposing, adjacent surfaces. A slide support is integrally attached to the narrow end of the lower wedge. The support has a longitudinal aperture therethrough with an axis parallel to the opposing, adjacent surfaces. The upper wedge has a threaded opening having an axis parallel to the opposing surfaces. The aperture in the slide support is in registry with the threaded opening and retains a screw having a threaded end which engages the threaded opening of the upper wedge. The screw has a radial groove therein. The slide support has a first opening perpendicular and tangential to the aperture and a pin disposed in the first opening to engage the groove and retain the screw within the aperture. A second threaded opening perpendicularly intersecting the aperture and the first opening is also located in the support. A ball is disposed in the second threaded opening engaging the groove of the screw and a threaded locking screw retains the ball in locking engagement with the groove. The outer end of the adjusting screw is knurled and the sides of the wedges have scales thereon which are in registry.

5 Claims, 4 Drawing Figures

ADJUSTABLE PARALLEL MACHINE TOOL

BACKGROUND OF THE INVENTION

1. Field of the Invention

The invention generally relates to an adjustable parallel machine tool. In particular, it relates to a machine tool employing opposing slideable wedges which is used singularly or in plurality as a precise height adjustment locating device under an object to be machined on such machines as a Bridgeport mill, a horizontal mill, or any other conventional machine where precise measurement of vertical height is a necessary requirement.

2. Description of Prior Art

Most machinists have a ready supply of hardened steel oblongs or parallels of various lengths, widths and heights. Such parallels and oblongs have been ground so that at least two sides are absolutely and precisely parallel, and have a specific dimension. When the machinist is in the preparation of setting up an object to be milled, routed or machined in any mode, he usually does not have the proper size of a particular vertical height of parallel or oblong.

Accordingly, to achieve a desired vertical height location beneath an object, the machinist must stack a plurality of parallels, one above the other, of various thicknesses, employing a trial and error type of method to reach a particular and final vertical height location by using a variety of thin metallic pieces known as "shim stock." Consequently, significant amounts of the machinist's time are involved in such operations and the cost becomes considerable and expensive. For example, one machinist set-up time on one machine, per 8-hour shift, may be as high as three hours per shift. A combined set-up time on 15 various machines may total 30 to 40 hours per 8-hour shift. On a monthly or annual basis, the set-up time is highly magnified, such a time element considered down time or nonproductive machining time.

In addition, when machining operations are not completed on one 8-hour shift, or for several 8-hour shifts on a complex object, the machinist must often remove his project at the end of the shift or day so that the machine may be stripped down and cleaned. This results in the repetition of set-up procedures for the machining during the following day. Thus, multiple set-up times reach a significant magnitude.

SUMMARY OF THE INVENTION

Accordingly, it is an object of this invention to provide a device whereby such machine set-up time is effectively reduced from hours to minutes.

It is another object of this invention to provide an adjustable machine parallel which has a simple structure and can be efficiently and economically manufactured.

It is a further object of this invention to provide an adjustable machine parallel which allows for ease of adjustment and does not bind during the adjustment operation.

An upper wedge-shaped slide has parallel sides, upper and lower planar surfaces and a threaded opening having an axis parallel to the lower surface. The lower surface of the slide has a T-channel therein parallel to the sides of the slide. A wedge-shaped base having parallel sides and upper and lower planar surfaces is located below the slide. The upper surface of the base has a tee thereon parallel to the sides of the base. The lower surface of the slide is adjacent to the upper surface of the base and in sliding contact therewith. The tee is slideably located within the T-channel and the upper surface of the slide is parallel to the lower surface of the base.

A slide support is integrally attached to the base and has a longitudinal aperture therethrough with an axis parallel to the opposing adjacent surfaces of the slide and base. The aperture is also parallel to the T-channel and tee groove. The aperture is in registry with an opening in the upper slide. An adjustment screw is disposed in the aperture and has a threaded end engaging the threaded opening in the slide. Means are provided for rotatably retaining the adjusting screw within the aperture in the slide support.

The adjusting screw has a radial shank groove therein. The slide support has a first transverse opening perpendicular and tangential to the aperture. A pin is disposed in the first transverse opening engaging the radially transverse shank groove of the adjusting screw and holding it in position. A second transverse threaded opening which is perpendicular to and intersecting the aperture is located in the slide support. A ball is disposed in the second transverse threaded opening and a locking screw engaging the threads of the second transverse threaded opening retains the ball in locking engagement with the groove of the adjusting screw. The end of the adjusting screw is knurled and a scale is provided on the sides of the base and wedge-shaped slide.

BRIEF DESCRIPTION OF THE DRAWINGS

These objects and features as well as others will become apparent to those skilled in the art by referring to the following specification and the accompanying drawings in which.

DESCRIPTION OF THE PREFERRED EMBODIMENT

Figure 1:
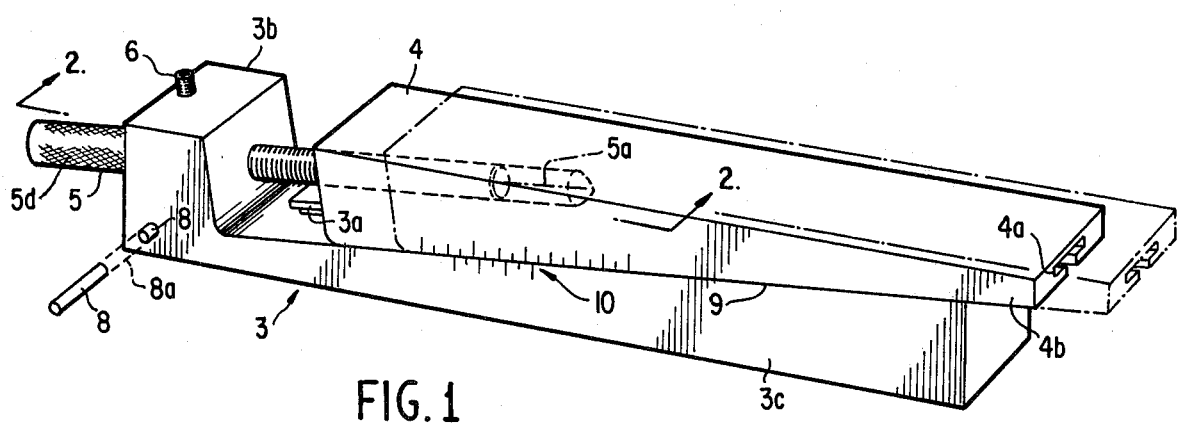
FIG. 1 is a perspective view of an adjustable parallel machine tool according to the invention.

As can be seen by referring to FIG. 1, a wedge-shaped slide 4 is angularly attached to the wedge-shaped base 3c of the lower portion 3 of the machine tool parallel. The wedge-shaped slide 4 is shown in a partially elevated position in FIG. 1. The slide 4 includes a channel which has a T-groove 4a for receiving a tee 3a attached to the wedge-shaped base 3c. The groove 4a and tee 3a are parallel to the sides 11, 12, 13 and 14 of the slide 4 and base 3c respectively. Side 11 is parallel to side 12 and side 13 is parallel to side 14. The lower surface of the slide 4 is a planar surface and the upper surface of the base 3c is a planar surface which are adjacent and opposing forming a plane 9.

The wedge-shaped slide 4 has a threaded opening 5b therein having an axis 5a which is parallel to the plane 9. The threaded opening 5b accepts the manual rotation of knurled adjustment screw 5.

Slide support 3b is integrally attached to the base 3c and has a longitudinal aperture 5c therethrough located on axis 5a which is parallel to the tee and T-channel.

Adjusting screw 5 has a knurled end 5d and a radially transverse shank groove 7 therein. Pin 8 is located in a first transverse opening having axis 8a which is perpendicular and tangential to axis 5c of the aperture 5c in the slide support 3b.

The slide support 3b also has a second transverse threaded opening having axis 6a which is perpendicular to and intersecting the aperture 5c. A ball 7a is disposed in the second transverse threaded opening engaging the groove 7. Reference character 6a generally refers to the axis of the screw 6 and, therefore, the second transverse threaded opening.

Figure 2:
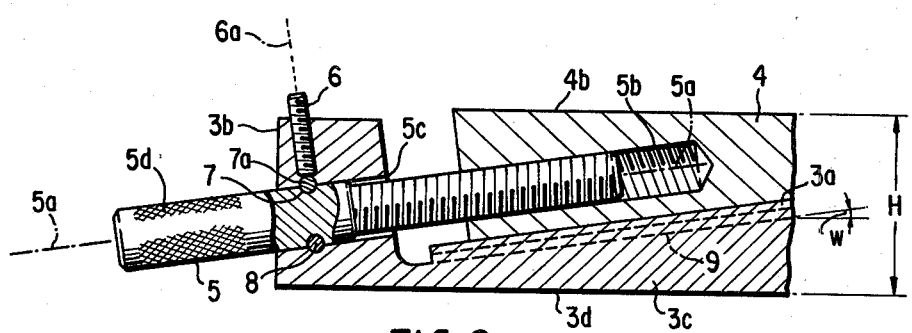
FIG. 2 is a vertical cross-sectional view taken substantially along lines 2—2 of FIG. 1 illustrating the retaining and locking means of the invention.
Figure 3:
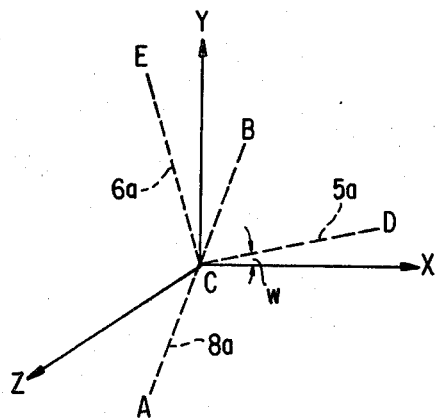
FIG. 3 is a diagram of the angular relationship of the structural elements of the invention.
Figure 4:
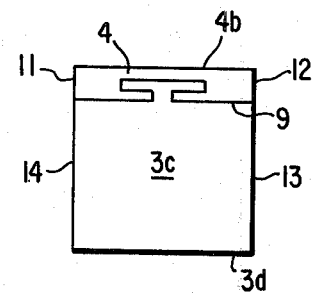
FIG. 4 is an end view of FIG. 1.

The angular relationship involved in the structure of the machine tool parallel can best be seen by referring to FIG. 3. Angle W, also shown in phantom in FIG. 2, is the angle between the plane 9 and the horizontal plane which is parallel to the upper surface 4b of the slide 4 and the lower surface 3d of the base 3c. Line ACB represents the axis 8a of the pin 8. Line CD represents the axis 5a of the adjusting screw 5. Line CE represents the axis 6a of the locking screw 6. Line CD lies and is perpendicular to lines CE and ACB. Similarly, line ACB is perpendicular to lines CE and CD. Generally speaking, lines CD and CE lie in the X-Y plane and line ACB lies in the X-Z plane. Due to the perpendicular arrangement of the lines, line ACB lies in plane 9 as does CD. This angular arrangement is an important feature of the invention which allows the adjustable machine parallel to function without binding as a parallel for machinists.

MODE OF OPERATION OF THE INVENTION

Irrespective of the position of the wedge-shaped slide 4 and the base 3c, the upper surface 4b of the slide and the lower surface 3a of the base are always in parallel relation. By grasping the knurled portion 5d of the adjusting screw 5 and axially rotating the adjusting screw 5, the threaded interaction between the screw and the threaded opening 5b in the wedge-shaped slide 4 causes the slide to move along plane 9 with respect to base 3c. When a desired elevated level of the slide 4 is reached, the adjustment screw 5 is manually locked into place by the tightening down of the locking set screw 6. This locking set screw 6 applies a vertical pressure or force directly on the locking ball 7, seating the locking ball 7 foreceably into the shank groove 7 of the adjusting screw 5. The advantage of using the locking ball 7 to this effect is that it prevents damage and wear to the shank groove 7 of the adjusting screw 5.

The parts of the adjustable machine tool parallel are constructed completely of metal, preferably steel. The base 3c and integral slide support 3b and the movable slide 4 are case-hardened or hardened by other conventional methods to have a sufficiently high Rockwell so that tapping will not scar or mar the surfaces.

The adjustable machine tool parallel is designed to be placed directly onto a mill table under an object to be machined, with the object to be machined resting securely in a vise and on the surface 4b of the top of the slide. The lower surface 3d of the base 3c rests on the surface of the mill table. The precise height adjustment H between the surfaces 4b and 3a is accomplished by means of a micrometer. Alternatively, scale 10 can be placed on the side 11 of the slide 4 and the side 14 of the base 3c to assist in the adjustment of the position between the slide 4 and base 3c. It is contemplated that this adjustable machine tool parallel may be used singularly or in plurality, with precise elevated settings of ±0.0001 inches being obtainable.

Various changes may be made in the details of the invention, as disclosed, without sacrificing the advantages thereof or departing from the scope of the appending claims. Furthermore, although the present invention has been disclosed and discussed with particular regard to its exceptional advantages in terms of use as a machine tool parallel, it may be understood that the invention may be employed in several industrial applications wherein parallel vertical surfaces having a specific distance therebetween is required. For example, it is contemplated that the machine tool parallel would be applicable as a leveling or other platform device.

It is further contemplated that the machine tool parallel would be standardly manufactured in varying sizes. Such sizes would vary the width of the machine parallel as well as the length and height. In this way, various sets of machine tool parallels can be related so that a given set of parallels could be employed with a given type of object which falls within a given range of sizes and tolerances.

What is claimed is:

1. An adjustable machine parallel comprising:
   a. a wedge-shaped slide having upper and lower planar surfaces, and a threaded opening with an axis parallel to said lower surface of said slide;
   b. a wedge-shaped base having parallel sides and upper and lower planar surfaces;
   c. said lower planar surface of said slide in sliding contact with said upper planar surface of said base, said upper planar surface of said slide parallel to said lower surface of said base;
   d. a slide support integrally attached to said base having a longitudinal aperture therethrough with an axis parallel to said lower planar surface of said slide and said upper planer surface of said base, said aperture in registry with said threaded opening, said slide support having a second threaded opening perpendicular to and intersecting said aperture;
   e. a screw disposed in said aperture having a threaded end engaging said threaded opening;
   f. means for rotatably retaining said screw within said aperture;
   g. said screw having a radial groove therein, said slide support having a first opening perpendicular and tangential to said aperture and said means for rotatably retaining said screw including a pin disposed in said first opening engaging said groove;
   h. a ball disposed in said second threaded opening engaging said groove;
   i. a screw having a threaded end engaging said second threaded opening and retaining said ball in locking engagement with said groove; and
   j. said first opening being perpendicular to said second threaded opening.

2. The adjustable machine parallel of claim 1 wherein said lower surface of said slide has a channel therein, said upper surface of said base has a protrusion therein slidably located within said channel.

3. The adjustable machine parallel of claim 2 wherein said channel is T-shaped and said protrusion is T-shaped.

4. The adjustable machine parallel of claim 1 wherein said screw has a knurled end opposite said threaded end.

5. The adjustable machine parallel of claim 4 wherein a first scale is located on a side of said slide and a second scale in registry with said first scale is located on a side of said base.

* * * * *